No. 864,308. PATENTED AUG. 27, 1907.
D. J. KELLY.
FILTERING APPARATUS.
APPLICATION FILED AUG. 10, 1906. RENEWED JUNE 11, 1907.
3 SHEETS—SHEET 1.
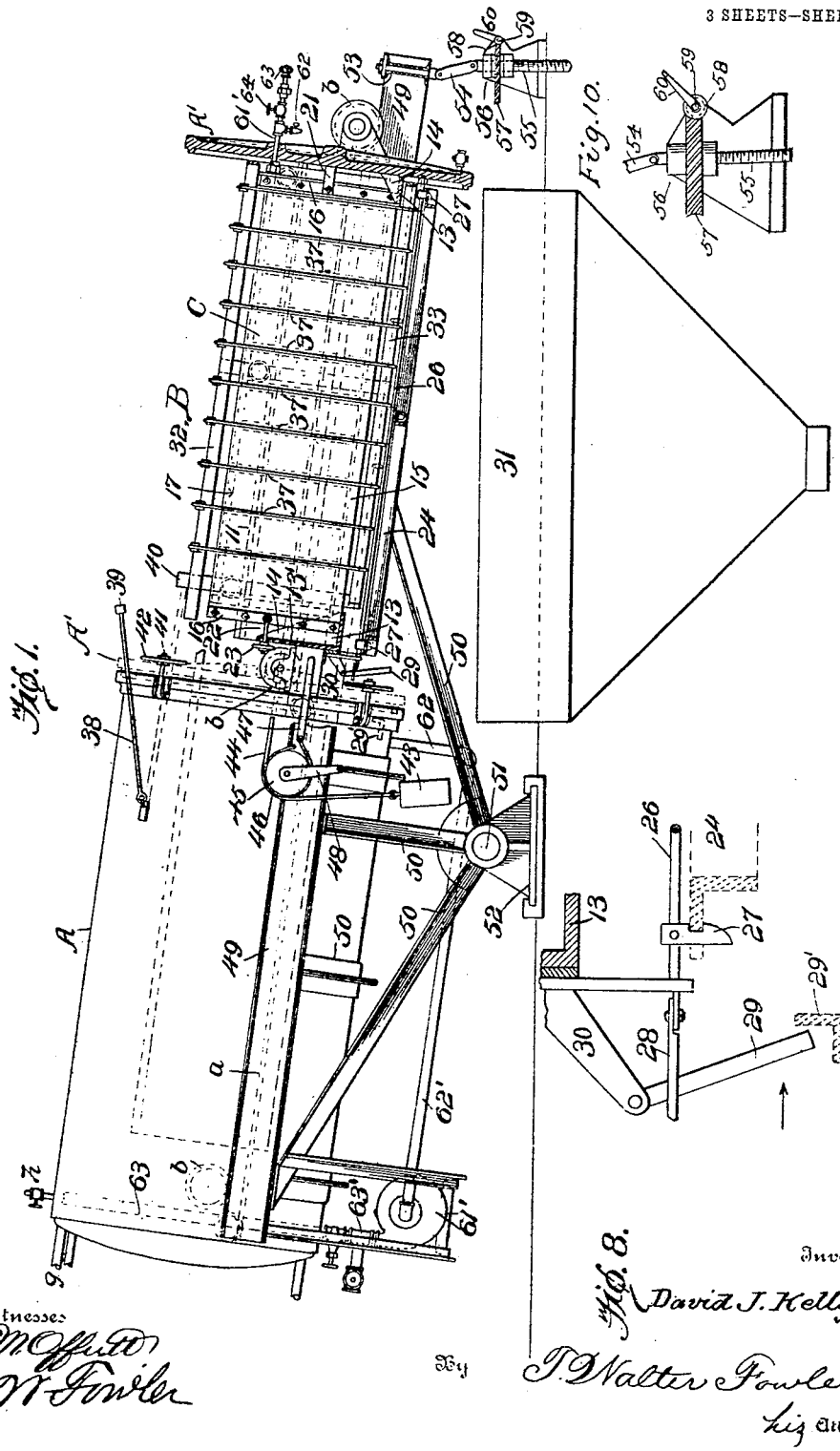
Witnesses
Inventor
David J. Kelly
By T. Walter Fowler
His Attorney

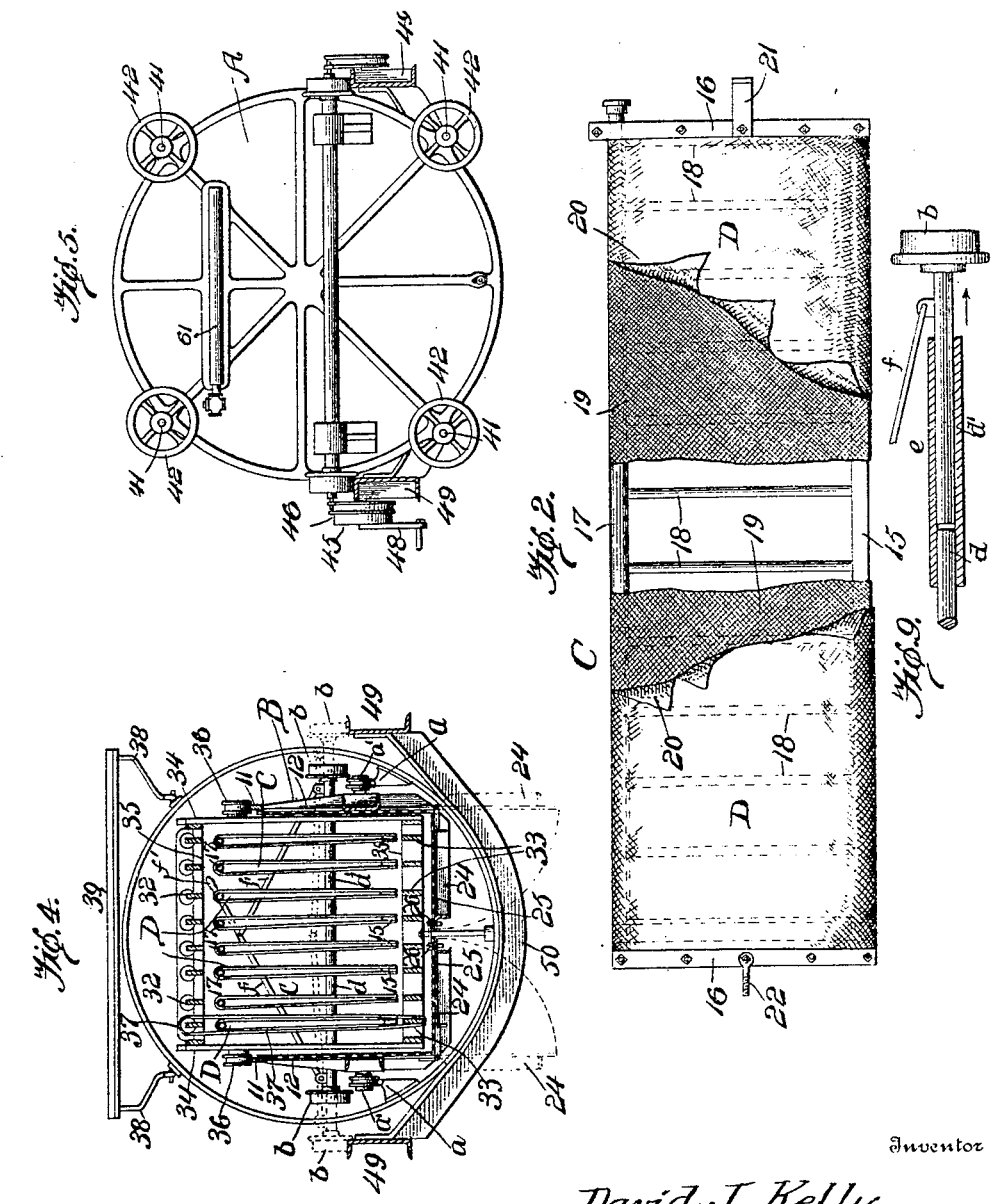

No. 864,308. PATENTED AUG. 27, 1907.
D. J. KELLY.
FILTERING APPARATUS.
APPLICATION FILED AUG. 10, 1906. RENEWED JUNE 11, 1907.
3 SHEETS—SHEET 3.
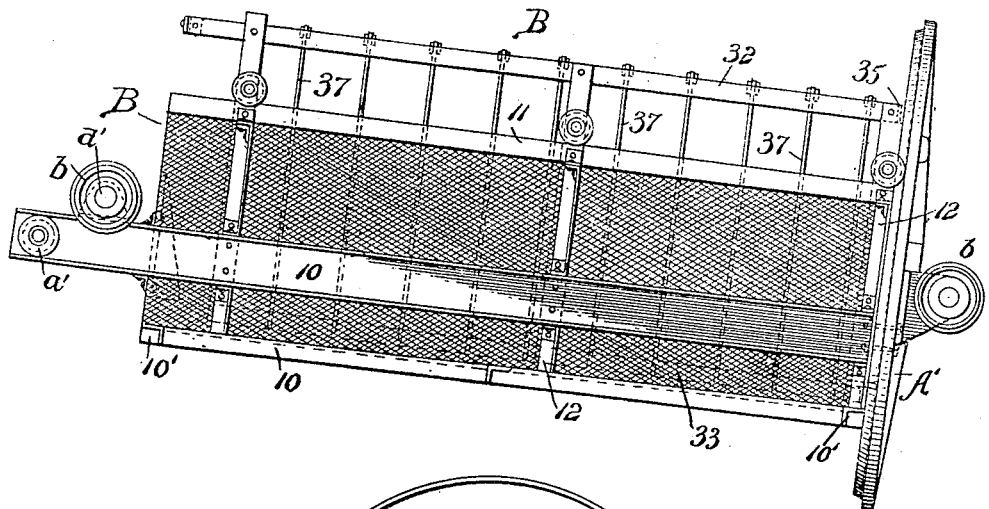
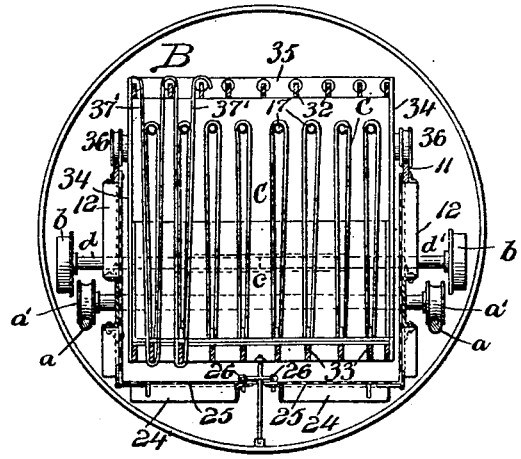
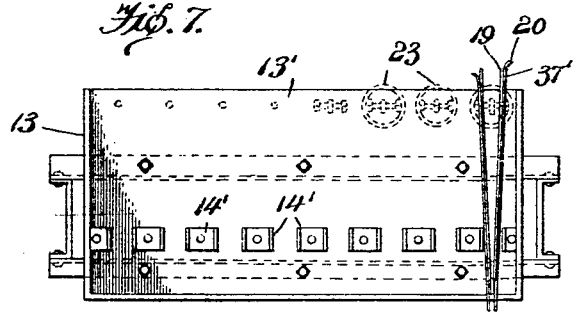
Witnesses
Inventor
David J. Kelly.
By T. Walter Fowler
Attorney

UNITED STATES PATENT OFFICE.

DAVID J. KELLY, OF SALT LAKE CITY, UTAH.

FILTERING APPARATUS.

No. 864,308. Specification of Letters Patent. Patented Aug. 27, 1907.

Application filed August 10, 1906, Serial No. 330,009. Renewed June 11, 1907. Serial No. 378,421.

*To all whom it may concern:*

Be it known that I, DAVID J. KELLY, a citizen of the United States, residing at Salt Lake City, in the county of Salt Lake and State of Utah, have invented new and useful Improvements in Filtering Apparatus, of which the following is a specification.

My invention relates to an apparatus designed especially to separate slimes from which precious metals have been dissolved and the liquid which holds the precious metals in solution; and my invention consists of the parts and the constructions and combinations of parts, which I will hereinafter describe and claim.

In the accompanying drawings, forming part of this specification, and in which similar characters of reference indicate like parts throughout the several views, Figure 1, is a side elevation of a slime-filtering apparatus embodying my invention. Fig. 2, is a plan view of a filter-frame removed, showing parts broken away. Fig. 3, is a side view of a filter-carrier. Fig. 4, is a cross section of the filter-tank and filter-frames. Fig. 5, is an end view of the tank showing the exterior of the removable head thereof. Fig. 6, is a sectional view similar to Fig. 4 but showing a modified arrangement of scraping or stripping wires. Fig. 7, is a view of end scraping casting of slightly modified form. Fig. 8, is an enlarged detail of a part of a sliding rod 26 with one of its lugs 27 and lever 29, and the dog for automatically releasing the rod. Fig. 9, is a detail of the two part shaft $d, d'$. Fig. 10 is an enlarged detail of the worm gear 57 and worm 58 and operating handle 60.

In the cyanid process, for example, when gold or silver bearing slimes are mixed or brought into contact with a cyanid solution the precious metals are dissolved and carried in the liquid in a state of solution.

To effect a separation of the metal bearing solution from the solid matter or slimes tailings by an improved filtering apparatus is the essential object of the present invention.

In carrying out my invention I employ a filter which I have found particularly useful for metallurgical work; but to this particular use the filter is not limited, since it may be successfully employed in other fields and substantially wherever the separation of solids from fluid matter is desired.

The filter includes a stationary tank A, set, preferably, at an incline and having a general cylindrical form, although it may have any other desired and suitable cross-sectional shape. This cylinder has one of its ends, preferably the higher one, permanently closed, while the opposite or lower end A' is capable of being opened and closed for the purpose of introducing and removing the filter-frames. As my process involves substantially a filtration under pressure, I make the tank sufficiently strong to resist the necessary applied pressure.

Extending along the inner sides of the tank are appropriate track rails $a$, upon which travel the wheels $a'$ of a carrier B, having a substantially rectangular form, as shown in Figs. 3, 4, and suitably interiorly braced. The carrier is connected with or made a part of the lower or movable head of the tank, and it is designed to support and carry the filter-frames, which latter, the wheeled carrier, and the removable head of the tank, constitute substantially a unitary structure, since the several parts are so related that they may be positioned and removed relative to the tank, although the filter-frames proper are so connected to the carrier that they may be removed when desired and additional frames substituted.

The filter-frames C, I prefer to make in the form of substantially rectangular bags or sacks D, interior to which are placed cross strips 18 or means for holding the sides of the bags or sacks apart and to prevent their collapsing under the pressure which I prefer to employ in carrying out the object of my invention and also to provide the necessary interior space for the free movement of separated or filtered liquid.

In the specific form shown, the carrier B comprises longitudinal and transverse channel iron or other bars or beams 10 10' and longitudinal top bars 11, the latter having their upper surfaces serving as tracks upon which a scraper device is movably guided as I will hereinafter describe, the said beams and bars being suitably supported by vertical bars 12 to form a rigid frame-work or carriage in which the filter devices proper are carried, and the sides and bottom of the said carriage being made foraminous or of appropriate reticulated material to give all the slimes free access to the filter. Each end of the carriage is made rigid with a transversely extending casting 13 having division plates 14 forming intervening spaces or guides in which the lower ends of the filter frames C are received and said frames maintained in a vertical position.

The filter frames may be of any desired number placed side by side in parallel series and spaced from each other as shown to afford access to the sides of the filters, which latter are preferably in the form of substantially rectangular bags or sacks D which in cross section have a general taper from the upper to the lower ends, as shown in Fig. 4, to facilitate the removal of the deposited material.

The filter frames C include longitudinal flat bottom bars or strips 15 and corresponding end bars or strips 16, said bars or strips 15, 16, being bolted or otherwise secured to form a rigid structure. The top bar of the filter frames is in the form of a pipe 17 extending from end bar to end bar and having perforations or inlets as shown and for the purpose of conveying away to the desired point all liquid passing through the filter sides.

In addition to the foregoing, the filter frames are supplied with internal bars 18 over which, on each side of the frame, is secured a foraminous or reticulated sheet 19 adapted as a backing and reinforce for the outer textile sides 20 of the filter.

In substance the filters are merely canvas or fibrous bags which are placed over the tube 17 and the bottom bars 15 the diameter of the former being sufficiently in excess of the thickness of the latter to impart to the bags the general tapered form from top to bottom as shown. In practice each of these frames is seated in the spaces in the castings 13 to preserve the appropriate spacing between the bags, and the front end bar of the frame has a forwardly extending plate 21 with a bent end by which it may be bolted or otherwise removably fixed to the movable front head of the tank A. The rear cross bar of the filter frame is provided with a bolt 22 which projects rearwardly through a hole in the vertical flange 13' of the rear spacing bracket 13, the outer end of the bolt being threaded to receive a turnable nut, as the hand wheel 23, by which the tension of the fibrous bags may always be regulated, it being understood that the ends of the bags are clamped between pairs of flat end bars or plates, as shown. This improved form of filter frame is of importance because of its strength, rigidity, and plane surface, the latter being essential to the successful operation of the mechanical stripping or scraping devices which I will hereinafter describe.

Before proceeding to a description of the stripping or scraping features, and to make the action of the latter better appreciated, I wish to state that the bottom of the carriage B is formed or provided with downwardly swinging doors 24 composed of angle iron and having floors of foraminous or reticulated material 25 forming the bottom of the carriage. In practice I have found woven wire of moderately coarse mesh a suitable means for my purpose, although any of the usual methods of forming screen surfaces may be employed it only being necessary to admit of free circulation of the solution in the tank A during the process of filtration.

In connection with the swinging doors 24 I employ an appropriate latching mechanism which is herein shown as including rods 26 extending longitudinally along the bottom portion of the carriage frame in a plane near the meeting edges of the doors, said rods being slidably mounted and having hook-shaped lugs 27 operable in slots in the angle-iron bars of the doors and adapted to hook into engagement with said bars to retain the doors in their elevated or closed position. The slidable rods 26 extend rearward of the carriage and are connected by links 28 with levers 29 pivoted to brackets or arms 30 fixed to the carriage as shown in Fig. 1. Fixed to the tank in the path of the lever 29 as the filter-frame carriage emerges therefrom, is a stop or dog 29' adapted to trip said lever and automatically release the closed doors 24, by moving said rods lengthwise until the hook-shaped lugs 27 disengage the doors and allow them to drop into the dotted position shown in Fig. 1, to discharge the solid cakes or fragments of cakes which their floors may be supporting, as I will hereinafter describe. When the doors are raised, or closed, the rods are moved to cause the lugs to hook into engagement with the doors and thus retain the latter in a locked position.

I have found that for the most successful operation of my apparatus, the foregoing construction or its mechanical equivalent is useful and more or less essential, as the doors virtually become baskets which are designed to catch any solid material which, under certain conditions, may slough off from the filter sides above, after the pressure inside the tank A is released, and prevent the accumulation of any solid cake, or fragments of cakes, on the bottom of the tank, where their presence would seriously interfere with the free travel of the filter frame carriage in and out of the tank A. These retaining and dumping doors 24 being connected to and forming a part of the carriage B moves with the same; as shown in Fig. 1, the dumping doors are designed to discharge the sloughed off material only when brought to a suitable position outside the tank, as for instance when the carriage with its filter frames has been moved from the dotted position within the tank to the full line position (Fig. 1) over the hopper or car or other receiver 31 placed to receive the material supported on the dumping doors.

The doors are hinged at the bottom edges of the sides of the carriage which sides and doors form substantially a filter frame inclosure which, in practice, is of suitable perforated, foraminous or reticulated material to admit of the free circulation of the solution in the tank during the process of filtration.

Under certain conditions, depending somewhat on the physical nature of the solid matter separated from liquid and the pressure used in effecting the efficient segregation of solid and liquid matter, I have found that sometimes the cakes of solid matter built up on the canvas sides of the filter frames will adhere to the canvas surface with more or less tenacity, rendering their removal a matter of delay. To obviate the delay, and render my apparatus of the greatest efficiency, I employ an automatic stripping mechanism such, for instance, as shown in Figs. 1 and 2, by which means the sides of the filter frames are stripped clean of adhering solid matter and made ready for return to the tank for the next filtration, by the time the carriage has emerged from the tank sufficiently to admit of unimpeded discharge of solid contents. This automatic stripping, or scraping mechanism, comprises a frame which includes a series of rods or bars 32 running parallel to, and above the filter frames and a like series of rods or bars 33 parallel to and under said frames, these upper and lower rods or bars being held in position by suitable framing, as the vertical bars 34 and cross bars 35 to form substantially a separate and distinct carriage, which, by means of suitable guides as the wheels or rollers 36 journaled on the said vertical bars 34 and engaging the track surfaces of the longitudinal top bars 11 of the filter frame carriage B, has a parallel end motion with said filter frame carriage. The primary function of the series of bars 32, 33, is to act as spreaders for appropriate wires 37, or other suitable scrapers, which pass outside and around the bars 32, 33, at right-angles to their horizontal axis, and lie vertically parallel with each other and in direct contact with the canvas surface of the filter frames.

On the outside of the tank A is hinged or pivotally mounted a latching device consisting of side arms 38 and a connecting catch bar 39; and across the upper series of bars 32 is a projection or dog 40 or equivalent means to be engaged by said catch bar.

The front end of the tank A also carries suitable swinging bolts 41, with nuts or hand wheels 42 by which the movable front head A' of the tank is locked in position. Attached to each side of the movable head A' is a counterweight 43 to which is attached a rope or connection 44, said rope having one or more turns around a pulley 45, journaled on the outside of the tank A and having a strap or band-brake 46 controlled by a lever 47. The pulley 45 is provided with a crank handle 48 by which it may be turned to raise the weight and allow the carriage B and its contained filter frames to emerge from the tank when it is necessary to do so and when there is no accumulation of slime on the filter frames. When the filter frames are devoid of adhering slime, the counterweights 43, are heavy enough to pull the carriage and its adjuncts back into the tank; but when the filter frames are loaded with slime, the extra weight of the latter is sufficient to elevate the weight and no other power is required to move the carriage in and out when the filter-press is operating.
As the movable head A' of the tank A is of somewhat greater diameter than the external diameter of said tank, it is necessary that suitable track beams 49 should be set off slightly from the sides of the tank, said rails being appropriately supported by an oscillating trussed support, as shown; and as the wheels upon which the filter frame carriage is movably supported after it emerges from the tank, are normally contained within the tank in a vertical plane which is interior to the vertical plane of the said track beams, it is necessary to provide means whereby the said supporting wheels b may be moved into the vertical plane of said beams 49 to allow the wheels to travel thereover, therefore I mount said wheels upon a divided or two-part shaft d d' which is transversely slidable in a sleeve e extending transversely across the end of the filter frame carriage, the members of said divided shaft being in turn connected to upwardly converging links or rods f which may be operated in a vertical plane to cause said links to push out and pull in the members of the divided shaft d d' and thereby project and retract the supporting wheels relative to the exterior track beams. The links form a toggle connection and one of them may be extended to form a handle f' by which the links may be raised and lowered to retract or project the divided axle and the supporting wheels carried thereby.

The operation of stripping or scraping the canvas sides of the filter frames, is substantially as follows: The operation of filtration having been completed, or carried to the required degree of completion, and the tank drained, the swinging bolts 41 attaching the head of main filter frame to the tank are released by manipulation of the hand wheels 42 and swung back on their hinges; whereupon the loaded frame, by reason of its weight exceeding that of the counterweights 43, starts slowly down the inclined track and emerges from retaining tank. As soon as it has emerged sufficiently to admit of their free opening, the bottom doors are automatically released as already described, and the catch-bar 39 is immediately lowered into a suitable position to engage the projections, or dog 40 on top of stripping or scraping frame, whereby the progress of said stripping or scraping frame is arrested while the main frame with its filter frame continues its downward travel on the inclined tracks; thus drawing the canvas surface of filter-frames past and in close contact with the now stationary wires or scrapers; and said wires or scrapers lying against the canvas filter sides and between the same and the cakes or solid matter built over the entire canvas surface by filtration, immediately exert a shearing, stripping or scraping action which disengages the assembled matter from the canvas surface. The distance necessary for main frame to travel after the drop bar has engaged the projection or dogs 40 of the stripping frame is dependent on the propinquity of the wires or scrapers to each other, i. e. if they are equally spaced at intervals of six inches from each other, then six inches travel of the main frame, beyond the aforementioned drop bar engaging point, will be sufficient to insure the effective scraping or stripping of the entire canvas surface, and the disengagement of the entire mass of assembled material. As soon as the stripping has been completed, the empty frame is drawn back into retaining tank, by the pull exerted by the counterweights 43 and the stripping frame riding free on its wheels automatically gravitates to its original position with its lower end abutting against the inside of head of main frame or carrier.

In the described operation of the stripping or scraping mechanism, I have made reference to the tracks upon which the filter frame carriage is run in and out of the tank. This track consists of the aforesaid channel iron beams 49 extending along the sides of the tank and a suitable distance beyond the front thereof, said beam being capable of adjustment to vary their inclination. The means shown for effecting said adjustment consists of substantially a trussed support 50 below the tank, said support being turnable in a vertical plane about the horizontal transverse shaft 51 mounted in a turn-table 52 about which the frame and its superstructure may be turned in a horizontal plane.

The front or free end of the track or beams 49 are connected by a cross beam 53 and said beam is in turn connected by links 54 with vertical screws 55 operable in nuts 56 fixed to worm gears 57 which latter are engaged by worms 58 fixed to a transverse shaft 59 having a handle 60 by which said shaft is turned to cause the screws 55 to raise and lower the tracks and trussed support 50 about the horizontal axis 51. This tilting mechanism I have found useful and desirable for the successful operation of my apparatus.

The consistency of the slime pulp, the size of the solid particles, and the general physical and chemical properties of the materials to be separated, all exercise some influence on the rate of mechanical segregation of solids and liquids, and, generally speaking, I find that the angle of inclination of the apparatus best suited to give maximum efficiency on any particular kind of material, is not necessarily so well suited to all kinds; this deviation of inclination may be generally said to increase in a certain ratio as the difference in specific gravity of the liquids and solids to be separated.

A horizontal position is desirable when the parts are being assembled, or when the apparatus is undergoing alterations or repairs. Variation of the angle of inclination is also of great service in governing the speed of the various described mechanical devices which depend upon the utilization of gravity to insure their automatic working.

Another desirable feature for the successful working of the apparatus is the uniformity of the consistency of the pulp in process of treatment. This is best accomplished by the employment of any suitable circulating device, but, in practice, I prefer to use a centrifugal pump 61′ and pipes 62′, 63′, which pump, by continuous operation, during the process of filtration, also prevents the deposition of solids on the bottom or sides of tank and frame.

The novel and improved form of filter frame or diaphragm is also of great importance on account of its strength, rigidity, and plane surface; the latter being absolutely essential to the successful operation of the mechanical stripping or scraping device.

The outlet pipes 17 which form the top frame piece of the filter frames are shown connected to a pipe 61 which is a simple and convenient arrangement if air, steam, water, or solution is to be forced into the inside of the filter bags for the purpose of further cleaning them. The pipes 61′ which couple to the aforesaid pipes 17 and 61 are each provided with a valve 62, and the said pipe 61 has a valve 63 which enables the condition of the solution to be ascertained at any time, primarily to see if there is any leak through the filter bags. If such leak is discovered, the faulty filter may be shut off by means of a suitable valve 64 with which each of the coupled pipes is supplied.

The solution may be delivered under suitable pressure into the tank through a pipe $g$ leading from some appropriate source of supply; and provision is made in the form of an air cock $h$ for the escape of the displaced air in the tank.

In Fig. 6, I show a modified arrangement of scraper device in which case the wires 37′ extend from one of the upper bars 32 down over one of the sides of the filter bags and beneath the lower bars 33 of the scraper frame, and up along the other side of the filter bag and over another upper bar 32 etc., which arrangement makes it possible to quickly remove individual filters without also removing companion scrapers.

In Fig. 7, I also show a slight modification of the spacing means of the end casting 13, this change consisting in bolting or otherwise securing to the casting the parallel spaced and flanged plates 14′ the interspaces between which form the channels in which the lower end portions of the filter frames are seated, in the manner before described.

Having thus described my invention what I claim as new and desire to secure by Letters Patent is,—

1. An apparatus of the character described comprising a closed tank, a carriage slidably mounted therein, a support upon which the carriage is movable outside the tank, said carriage containing a filter medium, means for supplying a solution to the tank under pressure whereby the liquid matter is forced through the filter while the solid matter is collected upon the outside of the filter, means for delivering the separated fluid outside the tank, and an automatically operating stripper or scraping mechanism operating coördinately with the outward movement of the filter-frame carriage to detach the solid matter adhering to the filters.

2. In an apparatus of the character described, the combination with a tank, and a carriage mounted therein and provided with filter medium, said carriage capable of a movement, into and out of the tank, means whereby the carriage is supported when removed from the tank, and a stripping or scraping mechanism movable with the carriage and operable over the surface of the filter medium, and means whereby the stripping or scraping mechanism and carriage are given a parallel movement one relative to the other, to detach the solid deposit upon the filter medium.

3. In an apparatus of the character described, the combination with a solution tank, a carriage normally contained therein and removable endwise therefrom, said carriage provided with a pressure filter, and a guide upon which the carriage is supported when removed from the tank, of a stripping or scraping mechanism operable over the filter, said mechanism being supported from and thereby movable with the carriage and having an independent movement relative to said carriage whereby during the outward travel of the carriage the solid matter on the filter is detached therefrom.

4. In an apparatus of the character described, the combination with a solution tank, a carriage normally contained therein and removable endwise therefrom, said carriage provided with a pressure filter, of a guide disposed substantially in line with the tank and over which guide said carriage is traversable after emerging from the tank, a stripping or scraping mechanism carried by the carriage and slidable relative thereto, and operable over the filter to detach solid matter deposited thereon, and means engageable with the stripping or scraping mechanism and adapted to hold the same during a portion of the outward travel of the carriage whereby the solid matter on the filter is automatically removed therefrom.

5. In an apparatus of the character described, the combination with a solution tank, a carriage normally contained therein and removable endwise therefrom, and provided with a pressure filter, of a guide projecting in front of the tank and upon which the carriage is adapted to travel, a stripper or scraper frame mounted on the carriage and movable therewith and including wires extending over the sides of the filter, said frame having a sliding movement relative to the carriage, and means for engaging the stripper or scraper frame and holding the same during a portion of the outward travel of the carriage whereby the solid matter on the filter sides is brought into contact with the wires and automatically removed therefrom.

6. The combination with a solution tank, a carriage normally contained therein, and removable endwise therefrom, said carriage provided with a plurality of filter frames having filter sides, of a support in front of the tank upon which said carriage is movable, a stripper or scraper frame supported on the carriage and composed of upper and lower bars and connecting wires said wires extending over the sides of the filter, and said frame having an independent movement relative to the carriage, and a catch member adapted to be engaged with the stripper or scraper frame during its coördinate travel with the carriage to hold said frame relative to the continued movement of said carriage whereby the solid matter on the filter sides is carried into contact with the wires and removed.

7. The combination with a solution tank, a carriage normally contained therein, and removable endwise therefrom, said carriage provided with a plurality of filter frames having filter sides, of a support in front of the tank upon which said carriage is movable, a stripper or scraper frame supported on the carriage and composed of upper and lower bars and connecting wires said wires extending over the sides of the filter, and said frame having an independent movement relative to the carriage, and a catch member adapted to be engaged with the stripper or scraper frame during its coördinate travel with the carriage to hold said frame relative to the continued movement of said carriage whereby the solid matter on the filter sides is carried into contact with the wires and removed, said catch member including a bar movably supported from the tank, and said stripper or scraper frame having a projecting member over which said bar catches.

8. In an apparatus of the character described, the combination of a solution tank and a carriage normally contained therein and removable endwise therefrom, and a pressure filter within the carriage, said carriage having foraminous sides and bottom and said bottom including hinged sections disposed below the filter and opening downwardly to discharge solid matter deposited thereon by the filter.

9. In an apparatus of the character described, the combination of a solution tank, a carriage normally contained therein and removable endwise therefrom, a plurality of filter frames within the carriage having filtering sides, said carriage having foraminous sides and bottom, said bottom including downwardly opening baskets or doors adapted to receive and dump the solid matter sloughed off from the filters above, and means engaging said baskets or doors to hold them in a normal closed position.

10. In an apparatus of the character described, the combination of a solution tank, a carriage normally contained therein and removable endwise therefrom, a plurality of filter frames within the carriage having filtering sides, said carriage having foraminous sides and bottom, said bottom including downwardly opening baskets or doors adapted to receive and dump the solid matter sloughed off from the filters above, and means engaging said baskets or doors to hold them in a normally closed position, said means including slidable rods or bars extending along the lower portion of the carriage in a plane proximate to the meeting edges of the doors, and having hook-shaped members adapted to engage and hold said doors in a closed position, and means for operating said rods.

11. In an apparatus of the character described, the combination with a solution tank, and a carriage normally contained therein and removable endwise therefrom, said carriage including end castings with spaced flanges forming intervening recesses, and a plurality of parallel filter frames within the carriage and having their lower end portion seated in said recesses whereby the frames are maintained in an upright position.

12. In an apparatus of the character described, the combination of a solution tank, a removable carriage normally contained therein, spaced filter frames in said carriage, and filter bags inclosing the frames, said frames being wider at the top than at the bottom to form tapering spaces between the adjacent sides of contiguous bags, whereby the discharge of segregated solid matter is facilitated.

13. In an apparatus of the character described, the combination with a solution tank and a carriage normally contained therein and removable endwise therefrom, said carriage including end castings each having a transverse series of recesses opening through their inner sides, a plurality of parallel filter frames within the carriage each of which has its lower end portion seated in one of the recesses of each casting, filter bags inclosing the frames, a foraminous backing for the sides of the bags, and means whereby the tension of the bags may be adjusted.

14. In an apparatus of the character described, the combination with a solution tank, a carriage normally contained therein and removable endwise therefrom, and provided with a filter medium, track irons extending along the outside of the tank, and extending forward of said tank, over which extending portion the carriage is movable, and a rockable trussed-frame upon which the tank and track-irons are appropriately supported, and means for rocking said frame to vary the inclination of the track-irons and tank.

15. In an apparatus of the character described, the combination with a solution tank, a carriage normally contained therein and removable endwise therefrom, and provided with a filter medium, track irons extending along the outside of the tank and extending forward of said tank, over which extending portion the carriage is movable, and a rockable trussed-frame upon which the tank and track-irons are appropriately supported, and means for rocking said frame to vary the inclination of the track-irons and tank, and a turn-table support for the rockable frame about which said frame may be turned in a horizontal plane.

16. In an apparatus of the character described, the combination with a solution tank, a carriage normally contained therein and removable endwise therefrom, a pressure filter inclosed by the carriage, track-irons outside of and extending parallel with the tank, and projecting forward of said tank, and laterally movable supporting members on the carriage adapted to engage and guide said carriage over the forwardly projecting portions of the track-irons.

17. In an apparatus of the character described, the combination with a solution tank, a carriage normally contained therein and removable endwise therefrom, a series of parallel filter frames in the carriage, filter bags inclosing the frames, a divided shaft extending across the rear end of the carriage and having wheels on the outer ends within the plane of the inner sides of the tank, track-irons outside of the tank and projecting beyond the front end thereof and over which projecting portion of said track-irons the carriage operates after it emerges from the tank, a spreader mechanism connected with the members of the divided shaft and adapted to move said members outwardly into the vertical plane of the track-irons whereby they may engage said irons and support the rear portion of the carriage thereon, said spreader mechanism also adapted to move the members of the divided shaft towards each other to retract the wheels within the plane of the inner sides of the tank, and a sleeve inclosing the divided shaft members.

18. In an apparatus of the character described, the combination with a solution tank, a pressure filter removably contained therein, a rockable support upon which the tank is mounted, a pipe connecting with the lower part of the tank, a pipe connecting with the upper part of said tank, and a pump connecting with said pipes and insuring circulation of the fluid contents of the tank.

In testimony whereof I have hereunto set my hand in presence of two subscribing witnesses.

DAVID J. KELLY.

Witnesses:
EARL R. PEMBROKE,
WALTER W. LITTLE.